United States Patent Office 3,018,005
Patented Jan. 23, 1962

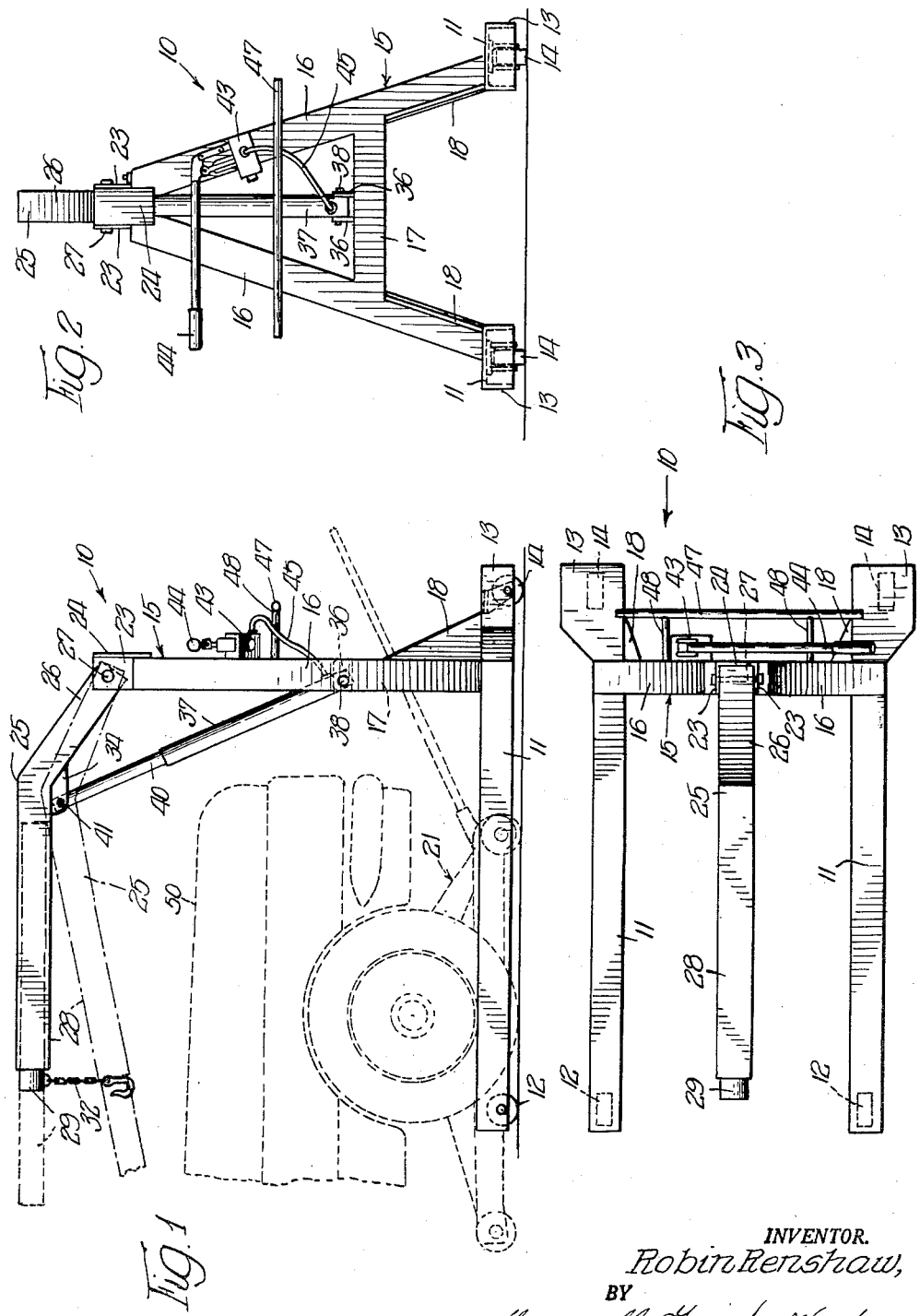

3,018,005
MOBILE CRANE
Robin Renshaw, West Chicago, Ill., assignor to Modern Hydraulics, Inc., West Chicago, Ill., a corporation of Illinois
Filed July 6, 1959, Ser. No. 825,098
4 Claims. (Cl. 212—8)

The present invention relates to mobile cranes and hoists and, more particularly, to mobile cranes for use in body shops and garages for removing engines from motor vehicles.

The general object of the invention is to provide a new and improved mobile crane which permits simultaneous use therewith of devices such as mobile automobile jacks and mechanic's gliders or slide boards.

An important object of the invention is to provide a new and improved mobile crane structure having a pair of spaced apart base runners wherein the structural arrangement is such that there is an unobstructed passageway of substantial height sufficient for a man on a glider or slide board to pass between the base runners from end to end.

A more detailed object of the invention is to provide a new and improved mobile crane of the type having a horizontally disposed, roller-supported base structure adapted to be positioned between the front wheels of a motor vehicle, a vertically disposed rigid frame carried on one end of the base structure, a boom member pivotably mounted on the upper end of the frame structure, and hydraulic power means for pivotably raising and lowering the boom member, wherein the base structure is specially designed and comprises a pair of elongated members spaced apart in parallel alignment whereby relatively low, floor-hugging devices such as mobile automobile jacks, mechanic's gliders or slide boards and the like may be passed between the base members from either end thereof.

Certain other objects of the invention will, in part, be obvious, and will in part appear hereinafter.

For a more complete understanding of the nature and scope of the invention reference may now be had to the accompanying drawings wherein:

FIG. 1 is a side elevational view of a preferred form of the invention as positioned for removing an engine from a motor vehicle, the front end portion of which vehicle is shown in broken lines, and showing in broken lines an automobile jack positioned for concurrent use with the improved crane of the invention;

FIG. 2 is a right end elevational view of the invention as shown in FIG. 1; and

FIG. 3 is a top plan view of the invention as shown in FIG. 1.

As illustrated in the drawings, the base structure of a mobile crane 10 embodying the invention is formed of a pair of elongated base members or runners 11, such as channel members disposed with their open sides down, which are spaced apart in parallel alignment. The left-hand spaced apart ends of the base members 11 (as viewed in the drawings) are each provided with a wheel or roller 12 which is rotatably supported in a suitable manner between the side flanges thereof. The opposite ends of the members 11 are somewhat enlarged, as at 13, whereby each accommodates a caster 14 each of which is pivotably secured against the underside of the web portion of the base member 11. The wheels 12 and the casters 14, which could be replaced by suitable skid members, support the base structure and permit movement thereof from place to place.

As best illustrated in FIG. 2, a vertically disposed rigid A frame 15 is carried on the base structure near the right end thereof (as viewed in the drawings). The A frame 15 is formed of a pair of upwardly and inwardly inclined side members or legs 16 which are suitably interconnected at their upper ends and a horizontally extending crossbar or brace member 17 which is secured between the legs 16 intermediate the upper and lower ends thereof. The lower ends of the legs 16 are rigidly secured to the spaced apart elongated base members 11 adjacent the enlarged end portions 13 thereof. Suitable gussets 18 may be secured between each of the legs 16 of the A frame 15 and its corresponding base member 11 for bracing purposes. The A frame 15 rigidly holds the base members 11 in their spaced apart, parallel alignment.

The crossbar 17 of the A frame 15 is disposed a substantial distance above the flat surface upon which the base structure is supported and there are no cross braces connected directly between the base members 11 along the length thereof. This arrangement thus provides an unobstructed passageway of substantial height sufficient to permit the movement of relatively low, ground-hugging devices, such as a mechanic's glider or slide board or a typical mobile automobile jack, such as the jack 21 illustrated in broken lines in FIG. 1, between the base members 11 from either end thereof and for the full length thereof.

A pair of vertically extending spaced apart bracket members 23 are secured to the interconnected upper ends of the legs 16 of the A frame 15 and may have an end plate 24 secured against the outer edges thereof. A boom member 25, which is provided with an obtuse bend intermediate its ends, has one end 26 pivotably mounted on a suitable pin or shaft 27 which extends between the spaced bracket members 23. The opposite end 28 of the boom member 25 extends generally above and between the base members 11 and is provided with a telescopically extensible inner member 29. Any suitable device (not shown) may be provided for locking the extensible member 29 in any one of a series of extended positions, one of which is shown in broken lines in FIG. 1. A chain 32 having a hook at its lower end is secured to the end of the extensible member 29 for engagement with the load to be lifted, such as the engine of a motor vehicle. The boom member 25 is provided with a pair of spaced apart brackets 34 which depend from the underside thereof adjacent the obtuse bend therein.

A pair of spaced apart upstanding brackets 36 are centrally arranged on the cross arm 17 of the A frame 15 and are rigidly secured thereto. A hydraulic cylinder 37 has one end pivotably mounted on a suitable pin or shaft 38 which extends between the upstanding brackets 36. The cylinder 37 is provided with a piston (not shown) which has a piston rod 40 connected thereto. The piston rod 40 extends outwardly from the opposite end of the cylinder 37 and has its outer end pivotably mounted on a suitable pin or shaft 41 which extends between the bracket members 34 which depend from the boom member 25. A hydraulic handpump 43 of a type well known in the art is secured to one of the legs 16 of the A frame 15 and includes a pumping handle 44. The pump 43 is connected to the lower end of the cylinder 37 by a conduit 45 whereby reciprocal pumping movement of the handle 44 moves the piston upwardly in the cylinder 37 and thus causes pivotal raising of the boom member 25. Suitable means are provided for releasing the pressure in the cylinder 37 for lowering the boom member 25. Two positions of the boom member 25 are indicated in FIG. 1.

This crane structure including the angular boom member, the rigid A-shaped supporting frame, and the open-ended base structure with the hydraulic cylinder and piston device pivotably connected between the crossbar of the A frame and the boom member adjacent the obtuse bend therein provides a crane which is extremely rugged and which is well adapted for a variety of lifting operations.

A horizontally extending handle 47 is rigidly connected between the legs 16 of the A frame 15 by means of a pair of outwardly projecting members 48 whereby to facilitate moving the crane 10 from place to place.

The operation of the crane 10 is relatively simple and will be described herein in connection with removing the engine from an automobile 50 the front end of which, with the hood removed, is shown in FIG. 1 in broken lines. The crane 10 is first wheeled into position with the base members 11 inserted between the front wheels of the automobile and with the boom member 25 extending generally over the engine thereof. The boom member 25 is then lowered until the chain 32 may be attached to the engine block after which the slack in the chain may be taken up by means of the hydraulic pump 43. A mechanic on a glider or slide board may then slide between the base members 11 to a position beneath the engine where he may safely loosen the bolts securing the engine to the frame of the vehicle and complete any further disconnecting operations. While the mechanic is under the automobile, the engine itself is supported by the crane 10, whereby to insure him against injury should an unexpected mishap occur. In some instances, it may be desirable to use a mobile automobile jack, such as the jack 21 shown in broken lines in FIG. 1, concurrently with the crane 10 by inserting it between the base members 11. After the engine has been freed from the vehicle frame, the pump 43 is operated whereby to raise the boom member 25 and lift the engine from its normal position in the automobile 50. The above discussion is merely an example of one use to which the mobile crane 10 disclosed herein may be put.

It will be understood that certain changes may be made in the construction or arrangement of the mobile crane disclosed herein without departing from the spirit and scope of the invention as defined in the appended claims.

I claim:

1. A mobile crane or hoist comprising, a pair of elongated, horizontally extending base members slidably supported slightly above a floor surface, a vertically disposed rigid frame structure having a pair of upwardly and inwardly inclined side members secured together at their upper ends and a horizontally extending brace member secured between the side members intermediate the upper and lower ends thereof, means securing the lower ends of said side members to adjacent ends of said pair of base members whereby said base members are rigidly held in spaced apart, parallel alignment, a boom member having one end pivotably mounted on the upper end of said frame structure, a hydraulic piston and cylinder device pivotably connected between the horizontal brace member of said frame structure and said boom member, and means for actuating said piston and cylinder device to pivotably raise and lower said boom member, said horizontal brace member of said frame structure being disposed a substantial distance above the upper surfaces of said base members and the opposite ends of said base members being disconnected whereby to provide an unobstructed passageway of substantial height sufficient for relatively low devces to pass between said base members from end to end thereof.

2. A mobile crane or hoist comprising, a pair of elongated, horizontally extending base members disposed above and closely adjacent to a floor surface to permit insertion thereof beneath a vehicle, a vertically disposed, rigid A frame with the lower ends of the legs thereof being secured to adjacent ends of said pair of base members whereby said base members are rigidly held in spaced apart, parallel alignment, the opposite ends of said base members being disconnected and the crossbar of said A frame being disposed a substantial distance above the upper surfaces of said base members whereby to provide an unobstructed passageway of substantial height between said base members from end to end thereof, roller means at opposite ends of said pair of base members for movably supporting the same, a boom member having one end pivotably mounted on the upper end of said A frame with the opposite end extending generally above and between said base members, said boom member having a bend intermediate its ends, a hydraulic piston and cylinder device pivotably mounted between the crossbar of said A frame and said boom member adjacent the bend therein, and means for actuating said piston and cylinder device for pivotably raising and lowering said boom member.

3. A mobile crane or hoist comprising, a pair of elongated, horizontally extending base members supported just above a floor surface whereby to permit insertion thereof beneath a vehicle between the wheels thereof, a vertically disposed, rigid A frame having a pair of inclined legs secured together at their upper ends and a horizontally extending crossbar secured between the inclined legs, the lower ends of the legs of said A frame being mounted on the upper surfaces of adjacent ends of said pair of base members whereby said base members are rigidly held in spaced apart, parallel alignment, the opposite ends of said base members being disconnected and the crossbar of said A frame being disposed substantially above the lower ends of the legs thereof and the upper surfaces of said base members whereby to permit passage of devices, such as mobile automobile jacks, gliders, slide boards, and the like, between said base members from either end thereof, a boom member having one end pivotably mounted on the upper end of said frame structure and the other end extending generally above and between said base members, a chain connected to said other end of said boom member and having a hook at the lower end thereof, a hydraulic cylinder having one end pivotably mounted on the crossbar of said A frame and having a piston movable therein, a piston rod having one end connected to said piston and its opposite end pivotally connected to said boom member, hydraulic pump means carried on one of the legs of said A frame and hydraulically connected to said cylinder for pivotably raising and lowering said boom member upon actuation thereof, roller members at opposite ends of said pair of base members for supporting the same, and a handle interconnected between the legs of said A frame to facilitate moving the crane from place to place.

4. A mobile crane or hoist comprising, a pair of elongated, horizontally extending base members, a vertically disposed, rigid A frame having a pair of inclined legs interconnected at their upper ends and having a horizontally extending crossbar secured between said legs, the lower ends of the legs of said A frame being rigidly secured to adjacent ends of said pair of base members whereby said base members are rigidly held in spaced apart, parallel alignment, means supporting said base members for movement along a flat surface, a horizontally elongated handle member rigidly secured between the legs of said A frame to facilitate moving the crane from place to place, a pair of vertically extending, spaced apart bracket members secured to the interconnected upper ends of the legs of said A frame, an elongated boom member having an obtuse bend intermediate its ends, means pivotably mounting one end of said boom member between said vertically extending brackets, a pair of spaced brackets depending from the underside of said boom member adjacent said obtuse bend, a pair of spaced upstanding brackets centrally mounted on the crossbar of said A frame, a hydraulic cylinder having one end pivotably mounted between said brackets on the crossbar of said A frame, said cylinder having a piston movable therein and a piston rod connected to the piston and projecting from the opposite end thereof, means pivotably connecting the outer end of the piston rod between the brackets on said boom member, a hydraulic hand pump mounted on one of the legs of said A frame and hydraulically connected to said cylinder whereby actuation of said hand pump causes pivotable raising or lowering of said boom member, a chain connected to the end of said boom member and having a hook at its lower end, the opposite ends of said base members being disconnected and said crossbar of said A frame being disposed a substantial distance above the base members whereby to provide an unobstructed passageway of substantial height sufficient for relatively low, ground-hugging devices, such as mobile automobile jacks, gliders, slide boards, and the like, to pass between said base members from end to end thereof.

References Cited in the file of this patent

UNITED STATES PATENTS

| | | |
|---|---|---|
| 1,786,060 | Greaves | Dec. 23, 1930 |
| 2,517,813 | Wallace | Aug. 8, 1950 |